United States Patent
Feigin

[11] 3,917,381
[45] Nov. 4, 1975

[54] LASER TRACKING SYSTEM

[75] Inventor: Leon Feigin, Westport, Conn.

[73] Assignee: United Technologies Corporation, Hartford, Conn.

[22] Filed: Sept. 25, 1972

[21] Appl. No.: 291,141

Related U.S. Application Data

[63] Continuation of Ser. No. 58,523, July 27, 1979, abandoned.

[52] U.S. Cl. .................... 350/7; 350/294; 250/203
[51] Int. Cl.² ........................................ G02B 27/17
[58] Field of Search ......... 350/294, 16, 7; 240/44.1; 250/203

[56] References Cited
UNITED STATES PATENTS
2,976,533   3/1961   Salisbury.............................. 350/294

FOREIGN PATENTS OR APPLICATIONS
323,006   7/1920   Germany .......................... 350/294
1,914,250   3/1969   Germany .......................... 244/3.16

Primary Examiner—Richard A. Farley
Assistant Examiner—N. Moskowitz
Attorney, Agent, or Firm—M. P. Williams

[57] ABSTRACT

A laser tracking system comprises a fixed convex paraboloidal mirror and a rotatable concave ellipsoidal mirror, a first focus of which is coincident with that of the paraboloid. The axis of the ellipsoid is angularly displaced from that of the paraboloid. A small diameter laser beam parallel to the axis of the paraboloid is incident thereon. The strongly diverging conical beam reflected from the paraboloid is incident upon the ellipsoid. An enlarged diameter slightly converging beam is reflected from the ellipsoid parallel to the angularly displaced axis thereof. Scanning of the converging beam is produced by rotating the ellipsoid about an axis passing through the common focus of both mirrors which is coincident with the axis of the conical diverging beam. The distant point at which the converging beam comes to a focus is the second focus of the ellipsoid. The distance of this point may be varied by moving the ellipsoid along the axis of the conical diverging beam to displace the foci of the mirrors from precise coincidence.

1 Claim, 9 Drawing Figures

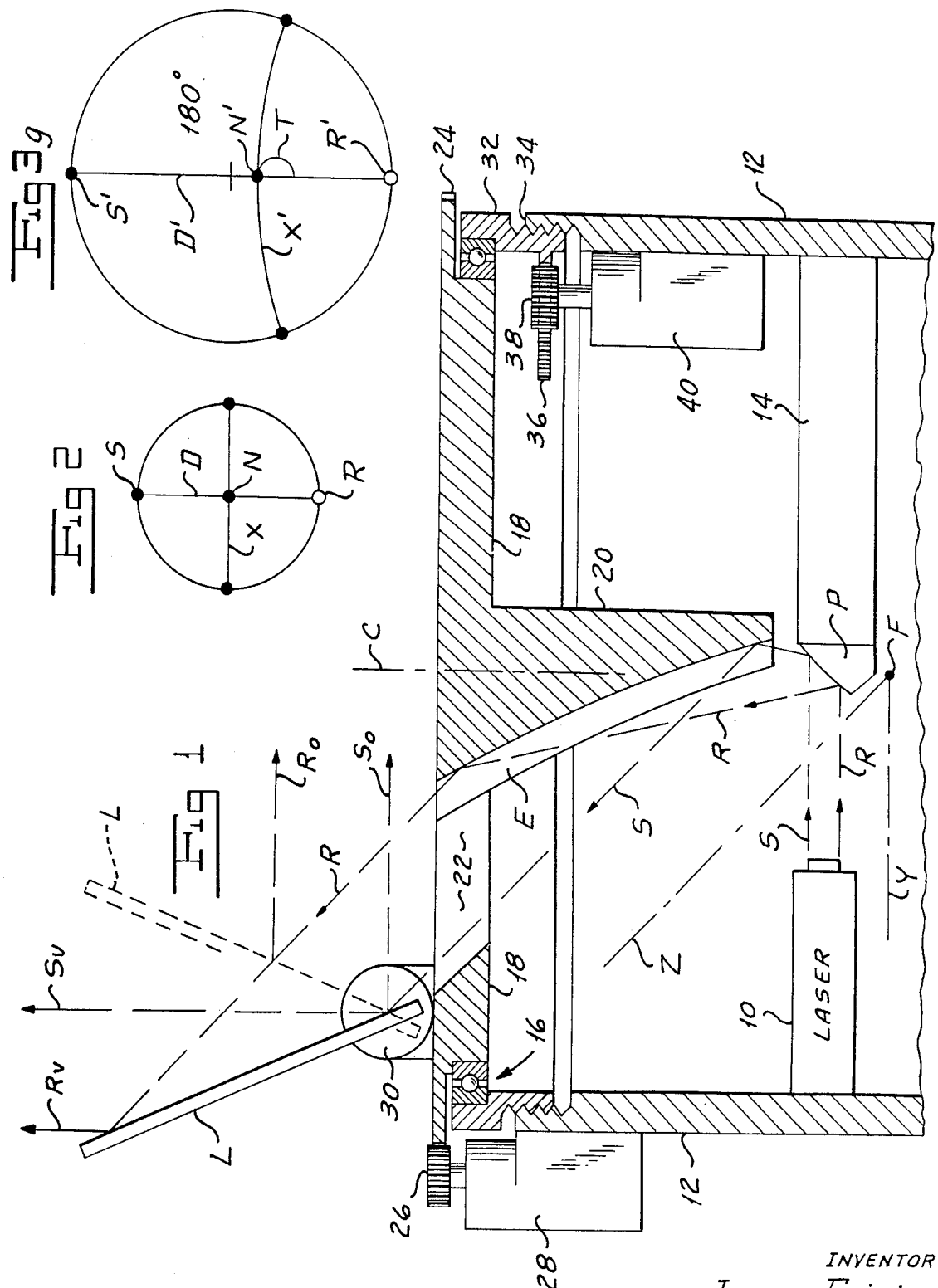

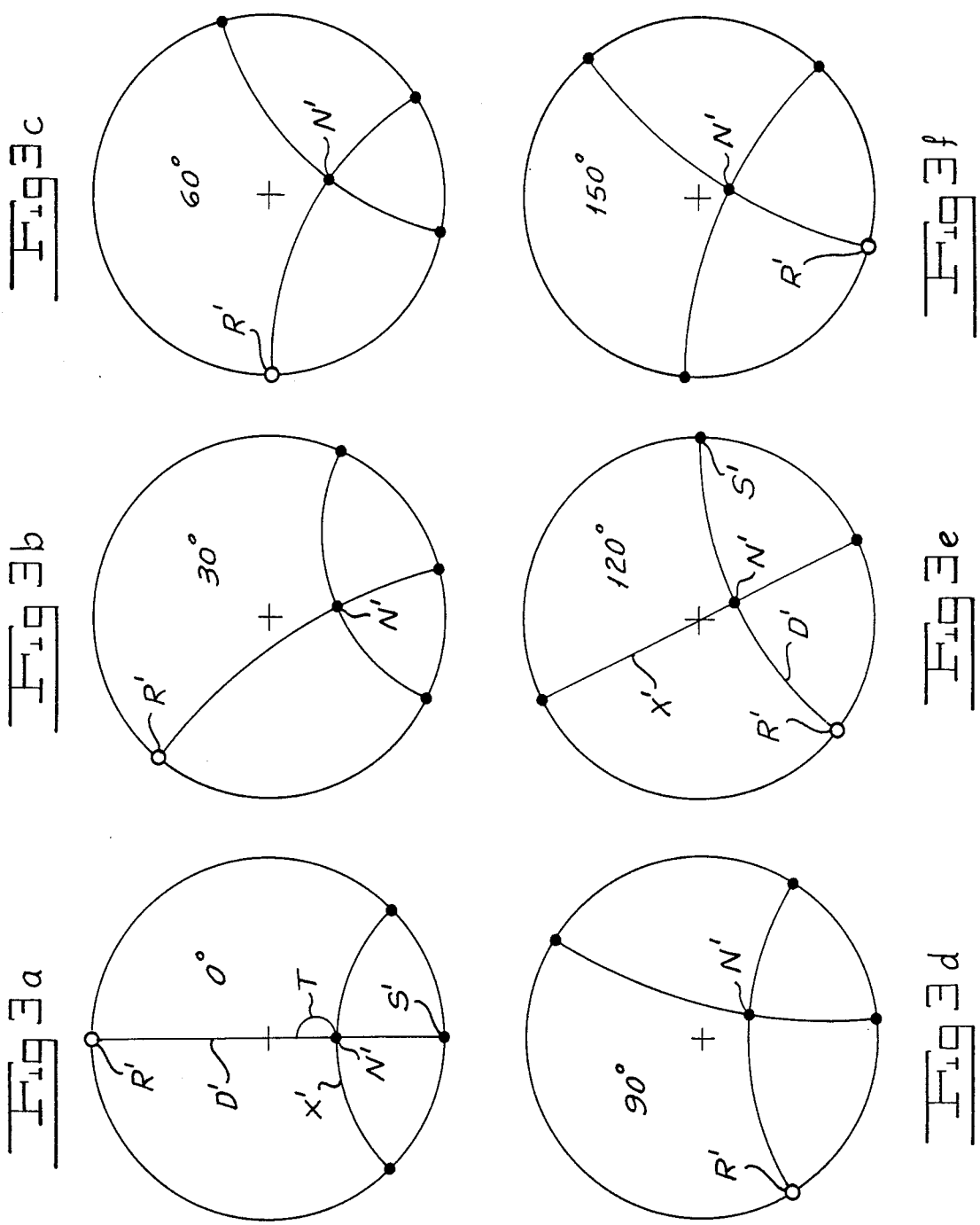

LASER TRACKING SYSTEM

This is a continuation of application Ser. No. 58,523, filed July 27, 1970, now abandoned.

SUMMARY OF THE INVENTION

One object of my invention is to provide a tracking system in which the energy from a laser beam is focused at a distant point.

Another object of my invention is to provide a high efficiency optical system in which the beam is both focused and deflected by mirrors.

Still another object of my invention is to provide an optical system in which a laser beam is first enlarged and then focused at a distant point to achieve a minimum spot area.

A further object of my invention is to provide a laser tracking system in which a circular input beam results in a circular output beam.

Other and further objects of my invention will appear from the following description.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional elevation showing a preferred embodiment of my invention.

FIG. 2 is a diagrammatic view showing the circular input beam from the laser.

FIGS. 3a through 3g are diagrammatic views showing the circular output beam which results at various azimuthal tracking angles.

DESCRIPTION OF THE PREFERRED EMBODIMENT

More particularly, referring now to FIG. 1 of the drawings, there is provided a hollow cylindrical housing 12 having a vertically extending axis C. Secured to the interior wall of the housing 12 is a laser 10 providing a circular beam of light which is directed toward the axis C and intersects it at right angles. Also secured to the interior of housing 12 is a support 14 which mounts a convex mirror P comprising a paraboloid of revolution having an axis Y which is parallel to the beam provided by laser 10 and having a focus F along the cylindrical axis C. The upper end 34 of housing 12 is provided with internal screw threads which cooperate with corresponding external screw threads of an intermediate hollow cylindrical member 32. Member 32 mounts the outer race of a bearing indicated generally by the reference numeral 16, the inner race of which mounts a horizontally disposed circular plate 18.

Plate 18 is provided with a depending centrally disposed member 20 which is provided with a concave mirror E comprising a portion of an ellipsoid of revolution having an axis Z. One focus of the concave ellipsoidal mirror E is coincident with the focus F of the convex paraboloidal mirror P. The axis Z of the ellipsoidal mirror is disposed at an acute angle relative to axis C.

The horizontally directed beam from laser 10 is incident on the convex paraboloid P and is reflected therefrom as a vertically directed cone having an apex at the common focus of mirrors P and E. The conical beam reflected from the paraboloid P is incident upon the ellipsoid E and is reflected therefrom as a circular beam having an axis parallel to the ellipsoidal axis C.

Plate 18 is provided with an aperture or window 22 through which may pass the circular beam reflected from the ellipsoid E to impinge upon a planar mirror L which is mounted on the upper surface of plate 18 for rotation about a horizontal axis which is orthogonal to the ellipsoidal axis Z. Planar mirror L governs the elevation angle of the output beam and is rotated by a motor 30 which is also mounted on the upper surface of plate 18.

Plate 18 is formed with external gear teeth 24 which engage a pinion 26 driven by a motor 28 mounted on the outside of housing 12. Intermediate member 32 is provided with an internal sector gear 36 which engages a pinion 38 driven by a motor 40 mounted on the inside of housing 12.

In operation of my invention, distant targets are tracked in azimuth by motor 28 which drives pinion 26 to rotate plate 18 about the axis C, thus changing the azimuthal orientation of the ellipsoidal axis Z and hence the azimuthal orientation of the beam reflected from mirror E. Distant targets are tracked in elevation by motor 30 which rotates planar mirror L from the position shown, where the output beam is vertically directed, to an alternate position shown in phantom, where the output beam is horizontally directed.

It will be noted that with the laser beam disposed at right angles to axis C, rotation of the ellipsoidal mirror cannot possibly interfere with the optical path between the laser and the paraboloidal mirror. However, it will be appreciated that axis Y and laser 10 may both be rotated somewhat clockwise in FIG. 1 about the common focus F without causing interference of the optical path between laser 10 and mirror P when mirror E is rotated to the 180° position. Axis Y should intersect axis C at an angle not less than that of axis Z. It will also be appreciated that axis Y and laser 10 may both be rotated counterclockwise in FIG. 1 about the common focus F, so that axis Y intersects axis C at an obtuse angle greater than 90°.

With one focus of ellipsoid E precisely coincident with the focus F of paraboloid P, the output beam will come to a focus at a distant point corresponding to the second focus of the ellipsoid. The distant point at which the output beam is focused may be varied by energizing motor 40 to drive pinion 38, thus rotating intermediate member 32 relative to housing 12. The cooperating screw threads on member 32 and extension 34 displace plate 18, member 20, and ellipsoid E relative to the paraboloid P along the axis C. Thus the first focus of the ellipsoid E may be slightly displaced along axis C from the focus F of paraboloid P. For example, if the rotation of intermediate member 32 is such as to move plate 18 upwardly, then the convergence of the output beam will be reduced and the distance of the point at which the output beam comes to a focus will be increased. On the other hand, if the rotation of intermediate member 32 is such as to move plate 18 downwardly, then the convergence of the output beam will be increased; and the distance of the point at which the output beam comes to a focus will be decreased.

If the diameter of the input laser beam is one unit and the diameter of the output beam reflected from planar mirror L is four units, then the ellipsoidal mirror E may have such construction that its two foci are displaced in excess of 1,000 units. The ellipsoidal mirror E is thus nearly paraboloidal. In order to accommodate a range of focal distances, the ellipsoid preferably has a displacement between foci which is approximately twice the minimum desired focusing distance. For example, an ellipsoid with a displacement between foci of 20,000 units (2M) will accommodate with little distortion changes in focal distance ranging between 10,000 units and infinity ($\infty$); stated alternatively, if the converging beam comes to a focus at a variable distance S, where $M \ \ S \ \ \infty$, the construction of the ellipsoidal mirror is such that the displacement between the second and third foci is 2M, where $M$ is the minimum focusing distance.

If a laser beam is to be focused at a distant point, then the minimum spot area at such point, as limited by diffraction, is equal to the square of the wave length divided by the solid angle subtended by the converging output beam. Accordingly, for a given wave length of light provided by laser 10, the spot area can be reduced only by increasing the solid angle subtended by the converging output beam. For a given focal distance, the solid angle subtended by the converging output beam may be increased only by increasing its diameter. For a given focal distance the solid angle varies as the square of the diameter of the output beam, which in turn is proportional to the area of the output beam.

In my system, the diverging conical beam which is reflected from the paraboloid and incident upon the ellipsoid increases the one-unit diameter of the input laser beam to, for example, a four-unit diameter of the output beam reflected from the ellipsoid. This means that for a given wave length and a given focal distance, the spot area is reduced by a factor of 16, which results in a much more intense concentration of optical energy upon a distant target.

Referring now to FIG. 2, there is shown the circular input beam from laser 10 having illustrative rays R and S along a first diameter D and further rays along a cross diameter X. The effective optical energy center N of the input beam is coincident with its geometric center. In FIG. 1, plate 18 is shown oriented in a position corresponding to an azimuth angle of 0°; and the path of rays R and S is illustrated. Output rays $R_v$ and $S_v$ correspond to a vertical output beam with planar mirror L in the position shown; and the output rays $R_o$ and $S_o$ correspond to a horizontal output beam where planar mirror L has been rotated to the alternate position shown in phantom.

I have found that for all azimuthal orientations of circular plate 18 the circular input beam from laser 10 results in a circular output beam from the ellipsoid E, and that the ratio of diameters of these circules also remains constant for all azimuth angles. However, the optical energy distribution within the output beam varies with azimuth angle in accordance with a bilinear conformal mapping function.

Referring now to FIG. 3a, there is shown the energy distribution within the output beam for an azimuth angle of 0° corresponding to the position of parts shown in FIG. 1. It will be noted that the first diameter D of the input beam maps into a corresponding diameter D' of the output beam. However, the cross diameter X of the input beam maps into a circular arc X' of the output beam; and the effective energy center N' of the output beam is approximately 20% of diameter below its geometric center.

FIG. 3b shows the energy distribution within the output beam at an azimuth angle of 30°. It will be noted that both the first diameter D and the cross diameter X of the input beam map into circular arcs for the output beam. The effective energy center N' of the output beam is approximately 19% of diameter below and approximately 3% of diameter to the right of its geometric center.

FIG. 3c shows the energy distribution within the output beam at an azimuth angle of 60°. Both diameters D and X of the input beam map into circular arcs for the output beam. The effective energy center N' of the output beam is approximately 17 below and 5% to the right of its geometric center.

FIG. 3d shows the energy distribution within the output beam at an azimuth angle of 90°. The diameters D and X of the input beam both map into circular arcs for the output beam; and the effective energy center N' of the output is approximately 14 below and 6% to the right of its geometric center.

FIG. 3e shows the output beam energy distribution at an azimuth angle of approximately 120°. The first diameter D of the input beam maps into a circular arc D' of the output beam. However, the cross diameter X of the input beam maps into an angularly displaced cross diameter X' of the output beam. The effective energy center N' of the output beam is approximately 11 below and 5% to the right of its geometric center.

FIG. 3f shows the output beam energy distribution at an azimuth angle of 150°. Diameters D and X of the input beam map into circular arcs of the output beam. The effective energy center N' of the output beam is approximately 9 below and 3% to the right of its geometric center.

FIG. 3g shows the output beam energy distribution at an azimuth angle of 180°. The diameter D of the input beam maps into a corresponding diameter D' of the output beam. The cross diameter X of the input beam maps into a circular arc X' for the output beam. The effective energy center N' of the output beam is approximately 8% of diameter below its geometric center.

It will be noted that as the azimuth angle varies from 0° to 180°, the effective energy center N' of the output beam describes an approximately semicircular path T, which is shown in FIGS. 3a and 3g.

The fact that the effective energy center N' of the output beam does not coincide with its geometric center for any azimuth angle does not, however, increase the spot area at the focused distance or otherwise impair the focusing of the output beam at such distance. All of the energy within the circular output beam will be focused within the minimum spot area as governed by the diffraction equation.

It will be seen that I have accomplished the objects of my invention. I have provided a high-efficiency laser tracking system in which the input beam is deflected by mirrors and focused at a point of variable distance. The input beam is enlarged to reduce the spot area at the distant focus. At all deflection angles, a circular input beam results in a circular output beam.

It will be understood that certain features and subcombinations are of utility and may be employed without reference to other features and subcombinations. It will be further understood that various changes may be made in details without departing from the spirit of my invention.

Having thus described my invention, what I claim is:

1. A laser tracking system including in combination a convex paraboloidal mirror having a first focus disposed on a first axis thereof, a concave ellipsoidal mirror having a second and a third focus disposed along a second axis thereof, means mounting the ellipsoidal mirror for rotation about a third axis, a laser providing a parallel beam of light having a fourth axis and a circular cross section of relatively small diameter, said laser being oriented and disposed such that the parallel beam is incident upon the paraboloidal mirror and reflected therefrom as a highly divergent conical beam of circular cross section having a fifth axis, the ellipsoidal mirror being disposed and oriented such that the third axis passes through the first and second foci and the first and second foci are approximately coincident, the second axis intersects the third axis at an acute angle, the first axis intersects the third axis at a predetermined angle which is not less than said acute angle nor greatly in excess of 90°, the fourth axis is parallel to the first axis and lies in the plane of the first and third axes, and the fifth axis is coincident with the third axis, and such that the diverging conical beam is incident thereon and reflected therefrom as a slightly convergent beam having a circular cross section of relatively large diameter for all rotational positions of said ellipsoidal mirror with respect to said paraboloidal mirror.

* * * * *